(12) United States Patent
Lamkin et al.

(10) Patent No.: US 7,448,021 B1
(45) Date of Patent: Nov. 4, 2008

(54) SOFTWARE ENGINE FOR COMBINING VIDEO OR AUDIO CONTENT WITH PROGRAMMATIC CONTENT

(75) Inventors: Allan Lamkin, San Diego, CA (US); Todd Collart, Los Altos, CA (US); Jeff Blair, San Jose, CA (US)

(73) Assignee: Sonic Solutions, a California corporation, Novato, CA (US)

( * ) Notice: Subject to any disclaimer, the term of this patent is extended or adjusted under 35 U.S.C. 154(b) by 623 days.

(21) Appl. No.: 09/649,215

(22) Filed: Aug. 28, 2000

Related U.S. Application Data

(63) Continuation-in-part of application No. 09/644,669, filed on Aug. 24, 2000, now abandoned.

(60) Provisional application No. 60/220,397, filed on Jul. 24, 2000.

(51) Int. Cl.
*G06F 9/44* (2006.01)
(52) U.S. Cl. .................................... 717/115
(58) Field of Classification Search ......... 717/114–117, 717/168–178, 100, 107; 709/201–231, 322–323, 709/250; 715/501.1, 500.1, 523; 707/10; 345/717, 744, 747, 719; 369/60.1
See application file for complete search history.

(56) References Cited

U.S. PATENT DOCUMENTS

| 4,672,572 | A | | 6/1987 | Alsberg ...................... 713/202 |
| 4,709,813 | A | | 12/1987 | Wildt |
| 4,710,754 | A | | 12/1987 | Montean |
| 4,739,510 | A | | 4/1988 | Jeffers et al. |
| 4,888,638 | A | | 12/1989 | Bohn .......................... 725/34 |
| 4,967,185 | A | | 10/1990 | Montean |
| 4,993,068 | A | | 2/1991 | Piosenka et al. |
| 5,023,907 | A | | 6/1991 | Johnson et al. |
| 5,109,482 | A | | 4/1992 | Bohrman |
| 5,128,752 | A | | 7/1992 | Von Kohorn |
| 5,274,758 | A | * | 12/1993 | Beitel et al. .............. 715/500.1 |

(Continued)

FOREIGN PATENT DOCUMENTS

DE         42 42 992  A1      6/1994

(Continued)

OTHER PUBLICATIONS

Chen et al., "Video and Audio : Organization and Retrieval in the WWW", White Paper. (1996) http://vosaic.com/corp/papers/www5. html. http://citeseer.nj.nec.com/chen96video.html.*

(Continued)

*Primary Examiner*—Tuan A Vu
(74) *Attorney, Agent, or Firm*—Fitch, Even, Tabin & Flannery

(57) ABSTRACT

A system and method for combining video/audio content with programmatic content perform the following steps: generating authoring output comprising a definition for a variable, and further comprising a representation of the video/audio content; selecting a source file, the source file comprising the variable; searching the source file for the variable, and replacing the variable with the definition for the variable; generating programmatic content in response to the searching; and generating an image as a function of the programmatic content and the representation of the audio/video content.

11 Claims, 3 Drawing Sheets

U.S. PATENT DOCUMENTS

| | | | |
|---|---|---|---|
| 5,289,439 A | 2/1994 | Koulopoulos et al. | 369/30.24 |
| 5,305,195 A | 4/1994 | Murphy | |
| 5,305,197 A | 4/1994 | Axler et al. | |
| 5,347,508 A | 9/1994 | Montbriand et al. | |
| 5,353,218 A | 10/1994 | DeLapa et al. | |
| 5,400,402 A | 3/1995 | Garfinkle | 380/231 |
| 5,410,343 A | 4/1995 | Coddington et al. | |
| 5,413,383 A | 5/1995 | Laurash et al. | |
| 5,420,403 A | 5/1995 | Allum et al. | |
| 5,457,746 A | 10/1995 | Dolphin | |
| 5,483,658 A | 1/1996 | Grube et al. | |
| 5,509,074 A | 4/1996 | Choudhury et al. | |
| 5,530,686 A | 6/1996 | Schylander et al. | 369/30.04 |
| 5,550,577 A | 8/1996 | Verbiest et al. | |
| 5,568,275 A | 10/1996 | Norton et al. | |
| 5,619,733 A | 4/1997 | Noe et al. | 710/61 |
| 5,640,453 A | 6/1997 | Schuchman et al. | |
| 5,640,560 A | 6/1997 | Smith | |
| 5,642,171 A | 6/1997 | Baumgartner et al. | 348/515 |
| 5,651,064 A | 7/1997 | Newell | |
| 5,659,792 A | 8/1997 | Walmsley | 715/500.1 |
| 5,673,195 A | 9/1997 | Schwartz et al. | |
| 5,677,953 A | 10/1997 | Dolphin | |
| 5,694,546 A | 12/1997 | Reisman | 705/26 |
| 5,696,898 A | 12/1997 | Baker et al. | |
| 5,717,879 A | 2/1998 | Moran et al. | |
| 5,734,719 A | 3/1998 | Tsevdos et al. | |
| 5,734,898 A | 3/1998 | He | |
| 5,736,977 A | 4/1998 | Hughes | 345/326 |
| 5,751,672 A | 5/1998 | Yankowski | |
| RE35,839 E | 7/1998 | Asai et al. | |
| 5,790,753 A | 8/1998 | Krishnamoorthy | |
| 5,801,685 A | 9/1998 | Miller et al. | 715/500.1 |
| 5,802,294 A | 9/1998 | Ludwig et al. | |
| 5,804,810 A | 9/1998 | Woolley et al. | |
| 5,805,442 A | 9/1998 | Crater et al. | 700/9 |
| 5,808,662 A | 9/1998 | Kinney et al. | |
| 5,809,250 A | 9/1998 | Kisor | 709/227 |
| 5,809,471 A | 9/1998 | Brodsky | |
| 5,812,661 A | 9/1998 | Akiyama et al. | |
| 5,819,284 A | 10/1998 | Farber | 709/203 |
| 5,822,291 A | 10/1998 | Brindze et al. | |
| 5,825,876 A | 10/1998 | Peterson, Jr. | 705/52 |
| 5,850,218 A | 12/1998 | LaJolie et al. | 725/45 |
| 5,857,021 A | 1/1999 | Kataoka et al. | |
| 5,860,068 A * | 1/1999 | Cook | 705/26 |
| 5,869,819 A | 2/1999 | Knowles et al. | |
| 5,872,747 A | 2/1999 | Johnson | 369/30.08 |
| 5,875,296 A | 2/1999 | Shi et al. | |
| 5,878,020 A | 3/1999 | Takahashi | |
| 5,878,233 A | 3/1999 | Schloss | |
| 5,882,291 A | 3/1999 | Bradshaw et al. | |
| 5,887,143 A | 3/1999 | Saito et al. | 709/248 |
| 5,889,980 A | 3/1999 | Smith, Jr. | |
| 5,892,825 A | 4/1999 | Mages et al. | |
| 5,892,900 A | 4/1999 | Ginter et al. | |
| 5,892,908 A | 4/1999 | Hughes et al. | |
| 5,893,910 A | 4/1999 | Martineau et al. | |
| 5,895,073 A | 4/1999 | Moore | |
| 5,899,980 A | 5/1999 | Wilf et al. | |
| 5,907,322 A | 5/1999 | Kelly et al. | |
| 5,907,704 A * | 5/1999 | Gudmundson et al. | 717/100 |
| 5,909,551 A * | 6/1999 | Tahara et al. | 709/231 |
| 5,913,210 A | 6/1999 | Call | |
| 5,915,093 A | 6/1999 | Berlin et al. | |
| 5,920,694 A | 7/1999 | Carleton et al. | |
| 5,922,045 A | 7/1999 | Hanson | 709/206 |
| 5,924,013 A | 7/1999 | Guido et al. | 725/67 |
| 5,930,238 A | 7/1999 | Nguyen | |
| 5,930,767 A | 7/1999 | Reber et al. | |
| 5,931,906 A | 8/1999 | Fidelibus et al. | 709/217 |
| 5,933,497 A | 8/1999 | Beetcher et al. | |
| 5,940,504 A | 8/1999 | Griswold | |
| 5,943,304 A | 8/1999 | Kamada et al. | |
| 5,950,173 A | 9/1999 | Perkowski | |
| 5,956,482 A | 9/1999 | Agraharam et al. | |
| 5,960,398 A | 9/1999 | Fuchigami et al. | |
| 5,969,898 A | 10/1999 | Hansen et al. | |
| 5,978,773 A | 11/1999 | Hudetz et al. | |
| 5,987,454 A | 11/1999 | Hobbs | 707/4 |
| 5,987,525 A | 11/1999 | Roberts et al. | |
| 5,991,374 A | 11/1999 | Hazenfield | |
| 5,991,399 A | 11/1999 | Graunke et al. | |
| 5,991,798 A * | 11/1999 | Ozaki et al. | 709/217 |
| 5,995,965 A | 11/1999 | Experton | |
| 6,006,328 A | 12/1999 | Drake | |
| 6,009,410 A | 12/1999 | LeMole et al. | |
| 6,012,071 A | 1/2000 | Krishna et al. | |
| 6,016,166 A | 1/2000 | Huang et al. | |
| 6,018,768 A | 1/2000 | Ullman et al. | |
| 6,021,307 A | 2/2000 | Chan | 725/110 |
| 6,034,937 A | 3/2000 | Kumagai | |
| 6,035,329 A | 3/2000 | Mages et al. | |
| 6,044,403 A | 3/2000 | Gerszberg et al. | |
| 6,047,292 A | 4/2000 | Kelly et al. | |
| 6,052,717 A | 4/2000 | Reynolds | |
| 6,052,785 A | 4/2000 | Lin et al. | |
| 6,055,314 A | 4/2000 | Spies et al. | |
| 6,061,057 A | 5/2000 | Knowlton et al. | |
| 6,064,979 A | 5/2000 | Perkowski | |
| 6,073,124 A | 6/2000 | Krishnan et al. | |
| 6,076,733 A | 6/2000 | Wilz, Sr. et al. | |
| 6,080,207 A * | 6/2000 | Kroening et al. | 717/172 |
| 6,081,785 A | 6/2000 | Oshima et al. | |
| 6,083,276 A * | 7/2000 | Davidson et al. | 717/107 |
| 6,097,291 A | 8/2000 | Tsai et al. | |
| 6,097,814 A | 8/2000 | Mochizuki | |
| 6,101,180 A | 8/2000 | Donahue et al. | |
| 6,101,534 A | 8/2000 | Rothschild | |
| 6,108,002 A | 8/2000 | Ishizaki | 725/58 |
| 6,108,687 A | 8/2000 | Craig | 709/203 |
| 6,119,147 A | 9/2000 | Toomey et al. | |
| 6,125,388 A | 9/2000 | Reisman | |
| 6,128,649 A | 10/2000 | Smith et al. | |
| 6,128,652 A | 10/2000 | Toh et al. | |
| 6,134,533 A | 10/2000 | Shell | |
| 6,134,593 A | 10/2000 | Alexander et al. | |
| 6,138,150 A | 10/2000 | Nichols et al. | |
| 6,141,010 A * | 10/2000 | Hoyle | 345/854 |
| 6,145,006 A | 11/2000 | Vishlitsky et al. | |
| 6,154,738 A | 11/2000 | Call | |
| 6,154,773 A | 11/2000 | Roberts et al. | |
| 6,154,844 A | 11/2000 | Touboul et al. | |
| 6,157,953 A | 12/2000 | Chang | |
| 6,161,132 A | 12/2000 | Roberts et al. | |
| 6,175,842 B1 | 1/2001 | Kirk et al. | 715/513 |
| 6,175,872 B1 | 1/2001 | Neumann et al. | 709/231 |
| 6,182,222 B1 | 1/2001 | Oparaji | |
| 6,184,877 B1 | 2/2001 | Dodson et al. | |
| 6,189,032 B1 | 2/2001 | Susaki et al. | |
| 6,192,340 B1 | 2/2001 | Abecassis | |
| 6,195,693 B1 | 2/2001 | Berry et al. | |
| 6,199,048 B1 | 3/2001 | Hudetz et al. | |
| 6,208,805 B1 | 3/2001 | Abecassis | |
| 6,219,675 B1 | 4/2001 | Pal et al. | |
| 6,226,235 B1 | 5/2001 | Wehmeyer | |
| 6,229,523 B1 | 5/2001 | Czako | |
| 6,230,174 B1 | 5/2001 | Berger et al. | |
| 6,230,324 B1 | 5/2001 | Tomita et al. | 725/51 |
| 6,233,618 B1 | 5/2001 | Shannon | |
| 6,233,736 B1 | 5/2001 | Wolzien | 725/110 |
| 6,239,793 B1 | 5/2001 | Barnert et al. | |
| 6,239,801 B1 | 5/2001 | Chiu et al. | |
| 6,240,459 B1 | 5/2001 | Roberts et al. | 709/232 |

| | | |
|---|---|---|
| 6,240,555 B1 | 5/2001 | Shoff et al. |
| 6,243,692 B1 | 6/2001 | Floyd et al. |
| 6,246,778 B1 | 6/2001 | Moore |
| 6,259,701 B1 | 7/2001 | Shur et al. ................. 370/401 |
| 6,263,501 B1 | 7/2001 | Schein et al. |
| 6,263,505 B1 | 7/2001 | Walker et al. ............... 725/110 |
| 6,282,713 B1 | 8/2001 | Kitsukawa et al. |
| 6,289,165 B1 | 9/2001 | Abecassis |
| 6,298,482 B1 | 10/2001 | Seidman et al. ............. 725/101 |
| 6,301,661 B1 | 10/2001 | Shambroom |
| 6,321,252 B1 | 11/2001 | Bhola et al. |
| 6,331,865 B1 | 12/2001 | Sachs et al. |
| 6,341,375 B1 | 1/2002 | Watkins ...................... 725/100 |
| 6,374,402 B1 | 4/2002 | Schmeidler et al. |
| 6,389,467 B1* | 5/2002 | Eyal ............................ 709/223 |
| 6,389,473 B1 | 5/2002 | Carmel et al. |
| 6,415,438 B1 | 7/2002 | Blackketter et al. ......... 725/136 |
| 6,418,471 B1 | 7/2002 | Shelton et al. .............. 709/227 |
| 6,449,653 B2 | 9/2002 | Klemets et al. |
| 6,453,420 B1* | 9/2002 | Collart ........................ 713/201 |
| 6,453,459 B1* | 9/2002 | Brodersen et al. ........... 717/100 |
| 6,460,086 B1 | 10/2002 | Swaminathan et al. |
| 6,462,754 B1* | 10/2002 | Chakraborty et al. ....... 715/723 |
| 6,463,468 B1 | 10/2002 | Buch et al. .................. 709/219 |
| 6,499,057 B1 | 12/2002 | Portuesi ....................... 709/219 |
| 6,505,169 B1* | 1/2003 | Bhagavath et al. ............ 705/14 |
| 6,510,467 B1 | 1/2003 | Behfar et al. |
| 6,516,467 B1 | 2/2003 | Schindler et al. |
| 6,523,063 B1* | 2/2003 | Miller et al. ................. 709/206 |
| 6,526,580 B2 | 2/2003 | Shimomura et al. ........... 725/63 |
| 6,529,949 B1 | 3/2003 | Getsin |
| 6,535,909 B1 | 3/2003 | Rust ............................. 709/204 |
| 6,543,053 B1 | 4/2003 | Li et al. ......................... 725/88 |
| 6,564,255 B1 | 5/2003 | Mobini et al. ............... 709/219 |
| 6,567,980 B1* | 5/2003 | Jain et al. ....................... 725/61 |
| 6,573,907 B1* | 6/2003 | Madrane ...................... 715/719 |
| 6,580,870 B1* | 6/2003 | Kanazawa et al. ............ 386/95 |
| 6,591,420 B1 | 7/2003 | McPherson et al. ........... 725/29 |
| 6,609,253 B1 | 8/2003 | Swix et al. ..................... 725/88 |
| 6,625,656 B2 | 9/2003 | Goldhor et al. ............. 709/231 |
| 6,659,861 B1 | 12/2003 | Faris et al. ...................... 463/1 |
| 6,691,106 B1 | 2/2004 | Sathyanarayan ................ 707/3 |
| 6,691,126 B1 | 2/2004 | Syeda-Mahmood ......... 707/102 |
| 6,694,309 B2 | 2/2004 | Cho et al. ....................... 703/3 |
| 6,698,020 B1 | 2/2004 | Zigmond et al. .............. 725/34 |
| 6,760,043 B2* | 7/2004 | Markel ........................ 345/717 |
| 6,769,130 B1 | 7/2004 | Getsin |
| 6,803,950 B2 | 10/2004 | Miyamoto et al. ........ 348/231.6 |
| 6,868,225 B1 | 3/2005 | Brown et al. |
| 6,941,383 B1 | 9/2005 | Getsin et al. ................. 709/248 |
| 6,944,621 B1 | 9/2005 | Collart ......................... 707/102 |
| 6,952,297 B2 | 10/2005 | Wickman et al. ............ 359/245 |
| 6,952,697 B1 | 10/2005 | Rothschild ...................... 707/9 |
| 2001/0001160 A1* | 5/2001 | Shoff et al. ..................... 725/51 |
| 2001/0005903 A1 | 6/2001 | Goldschmidt Iki et al. .... 725/50 |
| 2001/0056478 A1 | 12/2001 | Wheeler et al. ............. 709/219 |
| 2002/0026321 A1 | 2/2002 | Faris et al. |
| 2002/0057893 A1 | 5/2002 | Wood et al. ................... 386/46 |
| 2002/0073152 A1 | 6/2002 | Andrew ....................... 709/204 |
| 2002/0078144 A1 | 6/2002 | Lamkin et al. .............. 709/203 |
| 2002/0088011 A1* | 7/2002 | Lamkin et al. .............. 725/142 |
| 2002/0143774 A1* | 10/2002 | Vandersluis .................. 707/10 |
| 2002/0184627 A1 | 12/2002 | Alba et al. ..................... 725/39 |
| 2003/0005461 A1 | 1/2003 | Shinohara |
| 2003/0028892 A1 | 2/2003 | Gewickey et al. ........... 725/110 |
| 2003/0101232 A1 | 5/2003 | Ullman et al. ............... 709/217 |
| 2003/0204847 A1 | 10/2003 | Ellis et al. |
| 2004/0024889 A1 | 2/2004 | Getsin et al. ................. 709/229 |
| 2004/0040042 A1 | 2/2004 | Feinleib |
| 2004/0220791 A1 | 11/2004 | Lamkin ........................ 703/11 |
| 2004/0220926 A1 | 11/2004 | Lamkin .......................... 707/3 |
| 2004/0244041 A1 | 12/2004 | Getsin et al. ................... 725/89 |
| 2004/0255236 A1 | 12/2004 | Collart |
| 2005/0041150 A1 | 2/2005 | Gewickey ................... 348/565 |
| 2005/0044481 A1 | 2/2005 | Collart ..................... 715/500.1 |
| 2005/0166232 A1 | 7/2005 | Lamkin ......................... 725/43 |
| 2005/0182828 A1 | 8/2005 | Lamkin ....................... 709/219 |
| 2005/0193322 A1 | 9/2005 | Lamkin ..................... 715/500.1 |
| 2005/0198574 A1 | 9/2005 | Lamkin ....................... 715/719 |
| 2005/0251732 A1 | 11/2005 | Lamkin ..................... 715/500.1 |
| 2005/0251749 A1 | 11/2005 | Lamkin ....................... 715/719 |
| 2005/0265701 A1 | 12/2005 | Lamkin et al. .............. 386/125 |
| 2005/0278435 A1 | 12/2005 | Lamkin et al. .............. 709/219 |
| 2005/0278729 A1 | 12/2005 | Lamkin et al. .............. 719/328 |
| 2006/0004778 A1 | 1/2006 | Lamkin et al. ................. 707/10 |
| 2006/0041639 A1 | 2/2006 | Lamkin |
| 2006/0041640 A1 | 2/2006 | Lamkin |
| 2006/0107215 A1 | 5/2006 | Gewickey |
| 2006/0112336 A1 | 5/2006 | Gewickey |
| 2006/0117344 A1 | 6/2006 | Lamkin |
| 2006/0159109 A1 | 7/2006 | Lamkin |
| 2006/0161635 A1 | 7/2006 | Lamkin |
| 2006/0181965 A1 | 8/2006 | Collart |
| 2006/0182424 A1 | 8/2006 | Lamkin |
| 2006/0193606 A1 | 8/2006 | Lamkin |
| 2006/0195600 A1 | 8/2006 | Getsin |

FOREIGN PATENT DOCUMENTS

| | | |
|---|---|---|
| EP | 0 372 716 A2 | 6/1990 |
| EP | 0 762 422 A2 | 3/1997 |
| EP | 0 802 527 A1 | 10/1997 |
| EP | 0 809 244 A2 | 11/1997 |
| EP | 0 814 419 A2 | 12/1997 |
| EP | 0 849 734 A2 | 6/1998 |
| EP | 0 853 315 A2 | 7/1998 |
| EP | 0 809 244 A3 | 12/1998 |
| EP | 0 853 315 A3 | 1/1999 |
| EP | 0 849 734 A3 | 3/1999 |
| EP | 0 853 315 A3 | 12/1999 |
| JP | 10063562 | 6/1998 |
| JP | 11039262 A2 | 2/1999 |
| JP | 11039262 A2 | 12/1999 |
| WO | WO 98/47080 | 10/1998 |
| WO | WO 98/58368 | 12/1998 |
| WO | WO 99/14678 | 3/1999 |
| WO | WO 99/51031 | 10/1999 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |

OTHER PUBLICATIONS

Interactive Education: Transitioning CD-ROMs to the Web, by Michael Mascha, Gary Seaman, Department of Anthropology University of Southern California, Los Angeles, CA, USA , Computer Networks and ISDN Systems, North Holland Publishing, Amsterdam, vol. 27, No. 2, Nov. 1, 1994, pp. 267 through 272.
U.S. Appl. No. 09/476,190, filed Jan. 3, 2000, Todd R. Collart.
U.S. Appl. No. 09/488,345, filed Jan. 20, 2000, Todd R. Collart.
U.S. Appl. No. 09/488,337, filed Jan. 20, 2000, Evgenly Getsin.
U.S. Appl. No. 09/488,613, filed Jan. 20, 2000, Evgenly Getsin.
U.S. Appl. No. 09/488,155, filed Jan. 20, 2000, Evgenly Getsin.
U.S. Appl. No. 09/489,600, filed Jan. 20, 2000, Evgenly Getsin.
U.S. Appl. No. 09/488,614, filed Jan. 20, 2000, Evgenly Getsin.
U.S. Appl. No. 09/489,601, filed Jan. 20, 2000, Evgenly Getsin.
U.S. Appl. No. 09/489,597, filed Jan. 20, 2000, Evgenly Getsin.
U.S. Appl. No. 09/489,596, filed Jan. 20, 2000, Todd R. Collart.
Advanced Television Enhancement Forum Specification (ATEF), Comment Draft Version 1.0r1, 1-20 copy of printout from web site Http:www.atvef.com/atvef_spec/TVE-public.htm (Oct. 18, 1998).
http://www.spinware.net/portanet/portanet.html, printed on Jan. 8, 2003.
Abstract of Edgar Weippl's, "An Approach to Role-Based Access Control for Digital Content," 2001, IEEE, pp. 290-294.

"MarketScape(R) WebCD(TM) 1.0 Bypasses Internet Bottlenecks," DialogWeb, Aug. 26, 1996.

"Update Your Software While You Sleep," Edited by Paul M. Eng, Bits & Bytes, BusinessWeek, Updated Jun. 17, 1996, http://www.businessweek.com/1996/25/b3480140.htm.

"Web/CD-ROM hybrids; A working definition, " site established Oct. 2, 1998, http://www.philb.com/webcd.htm.

"World-Wide Web: a distributed paradigm for global networking"; Heylighen, F., Proceeding Share Europe Spring Conference: pp. 355-368; Apr. 18, 1994.

"A Simplified and an Efficient Packet Level Internet Access Control Scheme"; Igbal, MS, et al.; ICCS/ISITA '92; Singapore; IEEE Publications; 1992; pp. 963-967.

"CDLink", Duguid, Brian; The Wire, Apr. 1996, available at http://www.hyperreal.org/-duguid/wirecdlk/html.

"CDLink: Multimedia Liner Notes to Complement Your Music Collection", Mirapaul, Matthew; N.Y. Times (online ed.); Jan. 25, 1996; available at http://is.gseis.ucla.edu/impact/w96/News/News3/0125mirapaul.html.

"Voyager CDLink Turns Aduio CDs into CD-ROMs"; Press Release, Voyager Co.; (Jul. 12, 1995), available at http://www.voyagerco.com from Jul. 12, 1995 to 1997.

"Net Surf", Wired Magazine, Issue 4.05 (May 1996), available at http://www.wired.com/wired.archive/4.05/net_surf.html.

"Voyager CDlink (VCD) Control Language Reference", available at http:web.archive.org/web/19970213172801/www.voyagerco.com/cdlink/about/vcd_ref/cmdref.html, orginally available at http:www.voyagerco.com/cdlink/about/vcd_ref/cmdref.html on Aug. 8, 1995.

"Labels Link CDs, Web Sites Via CDLink", Marilyn A. Gillen, Billboard, Jul. 22, 1995, at 58.

HyperLOCK Technologies at a Trade Show at the Jacob K. Javits Convention Center, New York, New York, taken Aug. 1, 1996.

"Hybrid 'Net: CD-ROMs & the Web working in tandem"; Rosebush, et al.; www.netscapeworld.com/netscapeworld/nw-08-1996/nw-08-hybridcd.html; published Aug. 15, 1996.

"Going Hybrid: The Online CD-ROM Connection"; Stansberry; NEWMEDIA, Jun. 1995, pp. 34-40.

"CD-ROM and Web browsers: HTML as the Lingua Franca", CD-ROM Professional, Aug. 1996, vol. 9, No. 8 at p. 26.

Standard ECMA-130, "Data Interchange on read-only 120 mm optical data disks (CD-ROM)", 2nd Edition, Jun. 1996.

"Relative Uniform Resource Locators", Fielding, Jun. 1995, available at http://www.w3.org/Addressing/rfc1808.txt.

"A Beginners Guide to URLS", available at http://archive.ncsa.uiuc.edu/demoweb/url-primer.html, 1994.

"Naming and Addressing: URIs, URLs, . . . " available at http://www.w3.org/Addressing/, 1993.

Sastry, Chellury R. et al., "Webtour: A System to Record and Playback Dynamic Multimedia Annotations on Web Documents Content" Proceedings of the seventh ACM international conference on Multimedia: Oct. 1999, pp. 175-178.

Nkane, et al., Development of combined HDD and recordable-DVD video recorder, consumer Electronics, 2002, ICCE, 2002 Digest of Technical Papers, International Conference on Jun. 18-20, 2002, pp. 264-265.

U.S. Appl. No. 10/860,351, filed Jun. 2, 2004, Allan Lamkin.
U.S. Appl. No. 10/860,350, filed Jun. 2, 2004, Allan Lamkin.
U.S. Appl. No. 10/877,644, filed Jun. 25, 2004, Todd R. Collart.
U.S. Appl. No. 10/880,272, filed Jun. 28, 2004, Evgenly Getsin.

"Software Distribution by CD-ROM Linked with Network," IBM Technical Disclosure Bulletin, vol. 38, No. 11, Nov. 1, 1995, pp. 111-112.

Re: WebCD, Internet Posting, Rachel Polanskis, Dec. 2, 1996, http://www.anu.edu.au/mail-archives/link/link9612/0013.html.

"Labels Link CDs, Web Sites Via CDLink", Marilyn A. Gillen, Billboard, Jul. 22, 1995.

HypertLOCK Technologies at a trade show at the Jacob K. Javits Convention Center, New York, New York, taken Aug. 1, 1996.

Adams et al., "Distributed Search Terms: Meeting Asynchronously in Virtual Space" FX Palo Alto Laboratory, Inc. JCMC, Jun. 1999.

Manohar et al., "Replay by Re-execution: a Paradigm for Asynchronous Collaboration via Record and Replay of of Interactive Multimedia Sessions" SIGOIS Bulletin, Dec. 1994.

Minneman et al., "A Confederation of Tools for Capturing and Accessing Collaborative Activity" ACM Multimedia 95-Electronic Proceedings, Nov. 1995.

www.techdirt.com/articles/20030516/1358202.shtml, May 16, 2003.

www.techdirt.com/articles/990616/1020235_F.shtml, Jun. 16, 2003.

"MultiSync: A Synchronization Model for Mulitmedia Systems," *IEEE Journal On Selected Areas in Communications*, vol. 14, No. 1, Jan. 1996, pp. 238-248.

"Interactive Education: Transitioning CD-ROMs to the Web", by Michael Mascha and Gary Seaman, Department of Anthropology, University of Southern California, Los Angeles, California, USA, Computer Networks and ISDN Systems 27 (1994) 267-272.

Advanced Television Enhancement Forum Specification (ATVEF), Comment Draft Version 1.0r1, 1-20 copy of printout from web site Http://www.atvef.com/atvef_spec/TVE-public.htm (Oct. 18, 1998).

MBONE Multicasting Tomorrow's Internet, Request for Comments (RFC) 1112 and 1458, Appendices A and B, Copyright 1996, 1998.

Abstract of "MBone Provides Audio and Video Across the Internet," M. R. Macedonia and D. P. Brutzman, IEEE Computer, vol. 27, No. 4, pp. 30-36 (Apr. 1994).

Family Tree Maker Announces 5.0 Patch, by Rick Roberts, The Global Gazette, http://globalgazette.net/gazetec/gaztec15.htm, posted Sep. 27, 1998, vol. II, No. 13.

"When Signed, Sealed, Delivered, It's Yours," by Precision Marketing, p. 30 (1), Jul. 21, 1997.

http://www.spinware.net/portanet/portanet.html, no date.

Abstract of Edgar Weippl, "An Approach to Role-Based Access Control for Digital Content," 2001, IEEE, pp. 290-294.

Henry M. Gladney, "Safeguarding Digital Library Contents and Users: Document Access Control," Dlib Magazine, http://www.dlib.org/dlib/june97/ibm/06gladdney.html, Jun. 1997.

"All power to the Web: CD-ROM is dead—or is it?" by Richard Reisman, President, Teleshuttle Corporation, Jan. 1996 Teleshuttle white paper on Distributed Media, http://www.teleshuttle.com/tsdistrib.htm.

"CyberMedia Secures Major Licensing Agreement With Sony for Oil Change Software," http://www.cypbermedia.com/company/pr/sony.html, printed Nov. 26, 2001.

MarketScape's WebCD Pro Publisher, Ron Gustavson, Emedia Professional, Dec. 1997, http://www.emdialive.com/awards/award11.html.

"Hybrid CD-ROM/Online Titles Will Surge in 1996," DCD Business, Apr. 1996, http://www.tapediscbusiness.com/issues/1996/0496/apr_index.html.

"Trends Online: Intel's Internet Plans: Hybrid Applications", By Andy Grove, PC Magazine, Jul. 24, 1996.

"Internet tool triggers audio CDs," by Cate C. Corcoran, Jul. 24, 1995, http://www.access.ch/power/infoservices/MacWeek/MacWeek240795.html.

"MarketScape(R) WebCD(TM) 1.0 Bypasses Internet Bottlenecks," DialogWeb, Aug. 26, 1996, http://www.dialogweb.com.

"Microsoft Expands Benefits for Site Builder Network Members," Microsoft Press Releases, San Jose, CA, Oct. 29, 1996, http://www.spindia.com/trisoftdesign/Press/SBN/SBNtwkpr.htm.

"CD-ROM/Online Hybrids, The Missing Link?", by Richard R. Reisman, CD-ROM Professional, vol. 8, No. 4, Apr. 1995, http://www.teleshuttle.com/cdpart.htm.

Netstuff postings; Sep. 2-Sep. 6, 1996, Aug. 26-Aug. 30, 1996, Aug. 19-Aug. 23, 1996, Aug. 12-Aug. 16, 1996, edited by James Careless with files from the Newsbytes News Network, http://www.monitor.ca/monitor/issues/vol4iss1/netstuff.html.

"Oil Change software hunts down upgrades," by Bary Cooper, The Orlando Sentinel, Web-Posted Oct. 30, 1996, The Augusta Chronicle Online, http://www.augustachronicle.com/headlines/103196/oil_change.html.

Player 2.0 Product Description, Copyright 1995-2000, InterActual Technologies.

Resource Guide on Distributed Media: Local/CD-ROM/Online/Web, updated Nov. 25, 1996, Richard R. Reisman, President, Teleshuttle, http://www.teleshuttle.com/resource.

"Topic Is Veritably Everywhere: CD-ROM, the Web, Intranets, etc.," Seybold Report on Desktop Publishing, vol. 10, No. 7, Copyright 1996 by Seybold Publications Inc.,.

"Spin Webs around a CD-ROM: The Next Generation of CD-Web Hybrids, " Richard R. Reisman, President, Teleshuttle Corporation, Mass High Tech, Sep. 2, 1996, http://www.teleshuttle.com/nextgen.htm.

"Update Your Software While You Sleep," Edited by Paul M. Eng, Bits & Bytes, BusinessWeek, McGraw-Hill, Updated Jun. 17, 1996, http://www.businessweek.com/1996/25/b3480140.htm.

"Verity smooths Net searches," by CNET News.com Staff, Tech News—CNET.com, Feb. 20, 1996.

"Web/CD-ROM hybrids: A working definition," http://www.philb.com/webcd.htm.

Who's Who Hybrid Internet/CD-ROM Magazine/Catalog, Google cache printed Nov. 26, 2001, http://www.ecatcorp.com/alpha/mci.htm.

WebCD, Internet Posting, Roger Clarke, Dec. 1, 1995, http://www.anu.edu.au/people/Roger.Clarke/II/WebCD.html.

Re: WebCD, Internet Positing, Ron Ipsen, Dec. 1, 1996, http://www.anu.edu.au/mail-archives/link/link9612/0006.html.

Re: WebCD, Internet Postings, George Michaelson, Dec. 1, 1996, http://www.anu.edu.au/mail-archives/link/link9612/0003.html and Dec. 2, 1996, http://www.anu.edu.au/mail-archives/link/link9612/0011.html.

Re: WebCD, Internet Positing, Liddy Nevile, Dec. 2, 1996, http://www.anu.edu.au/mail-archives/link/link9612/0010.html.

Re: WebCD, Internet Posting, Rachel Polanskis, Dec. 2, 1996, http://www.anu.edu.au/mail-archives/link/link9612/0013.html.

E Media Professional Reviews, NSM Galaxy Jukebox, by David Doering, contributing editor for EMedia Professional, Apr. 1999.

Active Video Watching Using Annotation, by Nuno Correia and Teresa Chambel, International Multimedia Conference, Oct. 30 through Nov. 5, 1999, in Orlando, Florida, USA, ACM Digital Library, Dec. 5, 2000.

No Modem Needed: TV Signals Bring the Web to your PC, by Michael S. Lasky, Computing Storypage with IDG.net, from PCWorld.com and IDG.net site, web posted May 21, 1998.

All About Divx—The ProDivx Website at www.prodivx.com, Mar. 14, 2000.

* cited by examiner

US 7,448,021 B1

SOFTWARE ENGINE FOR COMBINING VIDEO OR AUDIO CONTENT WITH PROGRAMMATIC CONTENT

This patent document is a Continuation-in-part of U.S. patent application Ser. No. 09/644,669, filed on Aug. 24, 2000 now abandoned, for SOFTWARE ENGINE FOR COMBINING VIDEO OR AUDIO CONTENT WITH PROGRAMMATIC CONTENT, which claims the benefit of U.S. Provisional Patent Application Ser. No. 60/220,397, filed on Jul. 24, 2000 for DVD CONTENT GENERATION USING AN XML INTERFACE, all of which are incorporated herein by reference.

BACKGROUND OF THE INVENTION

The present invention relates the authoring of video and/or audio content (referred to generically herein as video/audio content), and programmatic content for storage on or transmission through a medium, and more particularly to a software engine for authoring video and/or audio content, and programmatic content for storage on or transmission through a medium, such as an optical storage medium, or a computer network (such as through downloading of a multimedia file, or streaming of video or audio). Even more particularly, the present invention relates to a software engine for receiving a definition for video or audio content and for combining the definition with programmatic content developed in a development environment, and for outputting a ROM image or transmission image as a function of the definition and the programmatic content.

Software authoring tools in the computer software industry provide various mechanisms to assist the software author in preparing software deliverables suitable for use by an end user. The purpose of these software-authoring tools is to provide a mechanism by which otherwise tedious and repetitive tasks can be streamlined. This may involve, for example, the conversion of software source code of one type into software source code of another type or the provision of subroutine libraries that can be invoked by or included by a software author in software deliverables in order to effect a business method sought to be achieved through a particular software implementation.

Recently, a great deal of attention has been focused on the digital video disk (DVD) industry, with deployment of DVD technology exceeding that of all prior or similar technologies, e.g., audio cassette tapes, video tapes, laser disks, compact disks and the like to a significant degree.

The use of DVD technology on computers, such as personal computers, has provided a combination that allows a degree of interactivity to be achieved between DVD content and an end user. Problematically, mechanisms for controlling DVD hardware using computer software have been quite primitive and limited in nature, and significant interactivity has been restrained.

With the Internet now a further mechanism for interactivity, the computer software industry's lack of DVD interactivity mechanisms has only further been highlighted.

The present invention advantageously addresses the above and other needs.

SUMMARY OF THE INVENTION

The present invention advantageously addresses the needs above as well as other needs by providing a system and method for authoring video or audio content, and programmatic content for storage on or transmission through a medium.

In one embodiment, the present invention can be characterized as a method for combining video/audio content with programmatic content comprising the following steps: generating authoring output comprising a definition for a variable, and further comprising a representation of the video/audio content; selecting a source file, the source file comprising the variable; searching the source file for the variable, and replacing the variable with the definition for the variable; generating programmatic content in response to the searching; and generating an image as a function of the programmatic content and the representation of the audio/video content.

In a further embodiment, the present invention can be characterized as a system for combining video/audio content with programmatic content. The system searches a source file for a variable, and replaces the variable with a definition for the variable; generates programmatic content in response to the searching; and generates an image as a function of the programmatic content and a representation of the audio/video content.

In yet a further embodiment, the invention can be characterized as a system for combining video/audio content with programmatic content. The system employs a parser adapted to search a source file for a variable, replace the variable with a definition for the variable, and generate programmatic content in response to the searching; and an image engine adapted to generate an image as a function of the programmatic content and a representation of the audio/video content.

In accordance with another embodiment, the present invention can be characterized as a software system employing a searching module for searching a source file for a variable, and for replacing the variable with a definition for the variable; a content generating module for generating programmatic content in response to the searching; and an image generation module for generating an image as a function of the programmatic content and a representation of the audio/video content.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
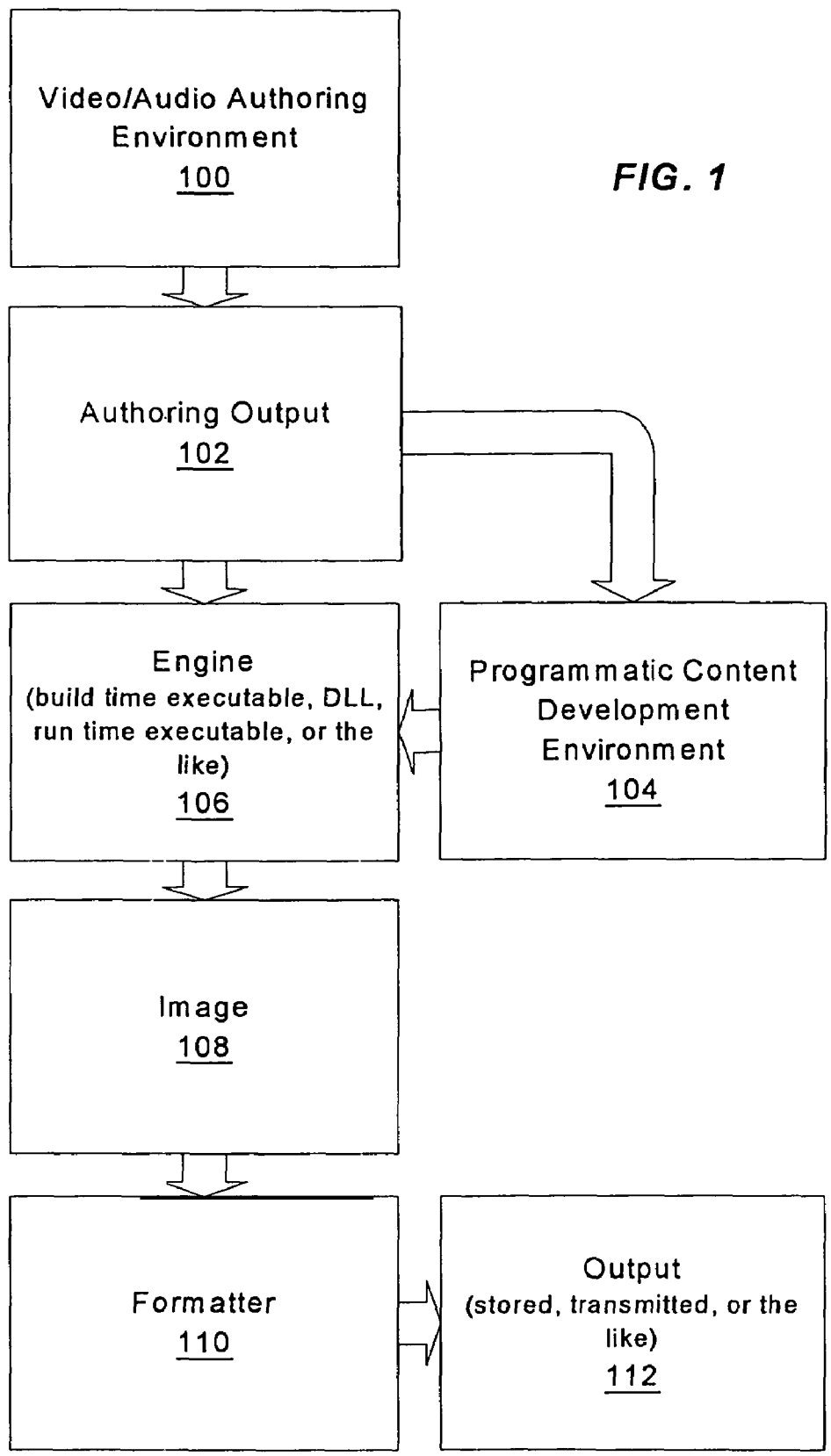
FIG. 1 is a block diagram showing basic components that comprise a system for combining video/audio content and programmatic content for storage on or transmission through a medium.

Referring first to FIG. 1, a block diagram is shown of basic components that comprise a system for combining video/ audio content and programmatic content for storage on or transmission through a medium. Shown is a Video/Audio authoring environment 100, authoring output 102, a programmatic content development environment 104, a software engine 106, an image 108, a formatter 110, and an output 112.

The Video/Audio Authoring Environment 100 generates the Authoring Output 102, which is provided to the software engine 106 (DVD-ROM engine) then to the Programmatic Content Development Environment 104. The Authoring Output 102 represents, distills and defines the video/audio content on a DVD, such as by representing the title and/or chapter points within the video/audio content using extensible markup language (XML). The Authoring Output 102 further includes at least one definition for at least one variable to be included in JavaScript and HTML source files, described further hereinbelow. The Programmatic Content Development Environment 106 is used to define and/or select one or more JavaScript and HTML source files, each containing at least one variable. The DVD-ROM Engine 106 matches variables that are defined within the Authoring Output 102 to the at least one variable in the JavaScript and HTML source file in order to generate the image 108 (DVD Image file) that is passed along to the Formatter 110, which is used to generate the output 112 (DVD Output).

The Video/Audio Authoring Environment 100 may be implemented using a combination of software and a computer, such as a personal computer. The personal computer comprises at least one central processing unit (CPU), memory, a display device, and an input device, such as a keyboard. Suitable storage medium, such as a magnetic or optical disk drive, or a memory, coupled to the computer may be used to store the Authoring Output 102 upon generation, and to transfer the Authoring Output 102 to the Programmatic Content Development Environment 104 and the DVD-ROM Engine 106. Similarly, the Programmatic Content Development Environment 104 may be implemented using a combination of software and a personal computer. The computer may be as described above, with a CPU, memory, display and input device. And, suitable storage medium (such as those described above) coupled to the computer may be used to store the JavaScript and HTML source files, and to transfer the JavaScript and HTML source files to the DVD-ROM Engine. The DVD-ROM Engine, like the Video/Audio Authoring 100 environment and the Programmatic Content Development Environment 104, may be implemented using a combination of software and a computer, such as a personal computer. The computer may be as described above, with a CPU, memory, display and input device. A suitable storage medium (such as those described above) coupled to the computer may be used to store the DVD Image and transfer the DVD Image to the Formatter. As with the Video/Audio Authoring Environment 100, the Programmatic Content Development Environment 104 and the DVD-ROM Engine 106, the Formatter 110 may be implemented using a combination of software and a computer, such as a personal computer. A suitable storage medium, such as a magnetic tape medium, may be used to store the DVD Output 112 prior to its transfer to a DVD.

Figure 2:
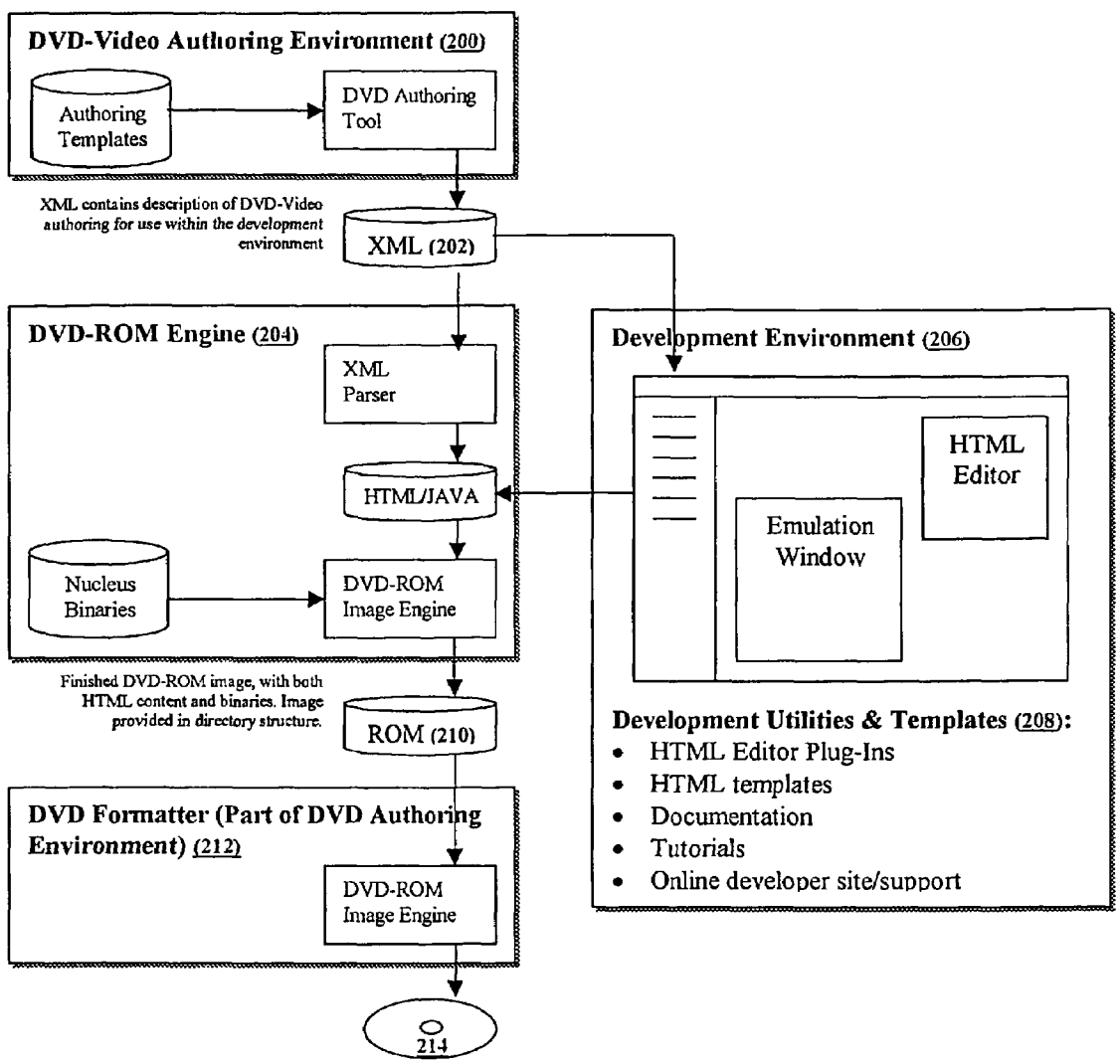
FIG. 2 is a detailed block diagram illustrating the basic components shown in FIG. 1 for combining video/audio content and programmatic content for storage on or transmission through a medium, such as a digital video disk (DVD)

Referring to FIG. 2, a detailed block diagram is illustrated having the basic components shown in FIG. 1 for combining video/audio content and programmatic content for storage on or transmission through a medium, such as a digital video disk (DVD) or the Internet (be it via a wired or wireless channel, a broadband or narrowband channel, and/or a downloaded or streaming format). (Generally, the use of storage media and transmission media are well known, and thus further explanation of DVD creation, the creation and use of downloaded multimedia files, the streaming of multimedia content, networking, and the like is not made. It is, however, contemplated by the inventors that any known or to be discovered storage medium technology or transmission medium technology could be adapted by a person of ordinary skill in the art for use in embodiments and variations of the subject matter described herein without difficulty.) Shown is a DVD-Video Authoring Environment 100, XML Authoring Output 202, a DVD-ROM Engine 204, a Development Environment 206, Development Utilities and Templates 208, a ROM Image 210, a DVD Formatter 212, and an Output 214.

The DVD-Video Authoring Environment 200, referred to above generically as the Video/Audio Authoring Environment, is comprised of Authoring Templates, and a DVD Authoring Tool. The DVD-Video Authoring Environment 200 is supplied by third parties, such as Daikin (Scenarist and ReelDVD), Sonic Solutions (Creator and DVD-IT) and Spruce Technology (Maestro and Convergence). The DVD-Video Authoring Environment 200 provides an ability to create DVD-Video and/or DVD-Audio elements (and, in some embodiments, CD-Audio elements) and provides or is modified to provide an ability to create a description of the DVD-Video and/or DVD-Audio (and/or CD-Audio) formatted using extensible markup language (XML), e.g., an XML source file, i.e., the Authoring Output.

When a DVD created using the present embodiment is launched, software within the device launching the DVD checks to see if the DVD contains programmatic content. For example, if the device launching the DVD is a personal computer using the Windows operating system from Microsoft, an "autorun.inf" present on the DVD may be used to launch software on the DVD that is responsive to the programmatic content on the DVD. If the DVD contains programmatic content, then the software within the device launching the DVD changes to a Full Screen Channel (PCFFSC), i.e., a full screen display, mode with HTML DVD video controls, and begins playing the DVD. An associated web window is closed. The associated web window will, however, appear if a URL event is triggered. The associated web window may be closed at any time (if it is open). However, the associated web window will reappear if a new URL event is triggered. There is preferably only one associated web window. The associated web window will update (i.e., its contents will be updated) if the associated web window is not closed before a new URL is triggered. The associated web window may be put to the back, bringing the Full Screen Channel (PCFFSC) (DVD) window to the front. If the associated web window is behind the Full Screen Channel (PCFFSC) (DVD) window and a new URL is triggered, the associated web window will move to the front.

If a DVD author chooses, web content can be automatically displayed in the associated web window, i.e., the web content can "launch" under the control of the movie, i.e., under the control of, e.g., the DVD-video, DVD-audio, or CD-audio content. Another option is to allow the user (at runtime) to click a button that brings up a context sensitive website. This latter option is referred to herein as "association", as opposed to, "launch".

A specific URL can be "launched" at various points within DVD-video, DVD-audio, or CD-audio content. Launching a URL has the affect of automatically (under DVD-video, DVD-audio, or CD-audio control) bringing up the associated web window, i.e., a browser, such as an imbedded browser, and displaying content from a URL specified by the DVD-video, DVD-audio or CD-Audio. This can also occur when a user is navigating the DVD-video, DVD-audio, or CD-audio menu structures, and selects a menu item that launches a URL.

The DVD-Video Authoring Environment 200 provides an ability to add URLs to chapter points and time markers that reference the start of a PGC (or program chain). (A program chain is a section of a DVD-video title set, i.e., of a single DVD. In other words, program chains are smaller segments of video within a DVD-video title set, i.e., on a single DVD. Thus, there can be a sequence program chains on a single DVD. For "Sequential PGCs" a chapter number and PGC number are the same.)

In accordance with the present embodiment, if a button is to launch a URL, the button must be authored so that the button navigates to a chapter point. This chapter point specifies the URL to launch. In most cases, the author will choose to display a still image when the device on which the DVD is launched is not able to display DVD-ROM content in accordance with the present embodiment that indicates that web links are only functional in "DVD-ROM-equipped" DVD Players.

The concept of an "association" means that while a movie is playing, a web URL can be associated with a button at any given point. This association has a hierarchy, so that the author can for example, define an overriding URL to the DVD, and then have other URLs take precedence, as the DVD is being played or navigated. For example, the author can add default title and default chapter URLs to the DVD URL above. At any given time, the user can click on an available AGo Online@ button, and the currently assigned URL, in accordance with the hierarchy, will be launched. Whether or not to launch a particular URL, i.e., display content at the URL in the associated web window, is under control of the user.

The Authoring Output 202 comprises an XML source file generated by the DVD-Video Authoring Environment 200. The DVD-Video Authoring Environment 200, described above, creates the XML source file 202 according to a ROM specification. This XML source file 202 gives an overview of the structure of the DVD, and indicates all events that have been specified by the author, i.e., URLs that are to be "launched" or "associated".

The DVD-ROM Engine 204 comprises runtime software (runtime binaries), an XML Parser, HTML/JAVA, and a DVD-ROM Image Engine. The DVD-ROM Engine 204 is preferably implemented as a dynamic link library (DLL) that can be called by the DVD-Video Authoring Environment. Alternatively, however, the DVD-ROM Engine 204 may be implemented as an executable, which offers that advantage that the DVD-Video Authoring Environment may be on a different computer than the DVD-ROM Engine, e.g., the DVD-Video Authoring Environment 200 may be on a Macintosh computer from Apple, while the DVD-ROM Engine may be on a "PC" operating the Windows operating system from Microsoft.

Alternatively, the DVD-ROM Engine 204 may be implemented as a browser plug-in, ActiveX control, Java class, or even as JavaScript and HTML code. Hence, as will be appreciated by the skilled artisan, an alternative to implementing the DVD-ROM Engine as a "build time" application, as described herein, the DVD-ROM Engine 204 can be implemented as a "run time" application, wherein only the XML source file and a "run time" implementation of the DVD-ROM Engine 204 are needed in order to fully realize the DVD-ROM functionality described herein, e.g., in order or "launch" and "associate" URLs at desired points within DVD title set. The functions of the DVD-ROM Engine 204 implemented as a "run time" application are similar to the functions of the DVD-ROM Engine 204 implemented as a "build time" application, as described herein below, the notable exception being that the "image" generated by the "build time" application is not stored or written, such as to a magnetic tape or DVD, but rather is L acted upon as it is generated.

As a "build time" application, The DVD-ROM Engine 204 parses Authoring Output (from the DVD-Video Authoring Environment) and generates a template-based DVD-ROM image 210 (including runtime software and programmatic content, e.g., web pages (HTML files), to be installed on the DVD), i.e., the image. The DVD-ROM image 210 preferably includes the software and programmatic content arranged in a specified directory structure that permits software and programmatic content specific to particular hardware/software platforms to be located and launched upon the launching of a DVD in a particular hardware/software platform. For example, the specified directory structure (including exemplary runtime software and programmatic content) may be as follows:

```
/ROOT
    INSTALL.EXE (WIN)
    README (MAC)
    README.TXT (WIN)
    DISC.ID
    AUTORUN.INF
    /COMMON
        /CONTENT
            general content (runs on multiple platforms)
        /SETUP
            LANG.INI
            SETUP_EN.BMP
            SETUP_JA.BMP
            SETUP_FR.BMP
            LIC_EN.TXT
            LIC_JA.TXT
            LIC_FR.TXT
    /MAC
        /CONTENT
            content specific to Macintosh platform
        /SETUP
            PCFRIENDLY PLUG IN
            FLASH 4
    /WIN
        / CONTENT
            content specific to Windows platform
        /SETUP
            PCFRIEND.ICO
                    INUNINST.EXE
                    UPDATE.DAT
            /CABINETS
                MAIN.CAB
                VIDEO.CAB
                OTHER.CAB
            /THIRDPTY
                /DRIVERS
                /MACROMED
                    SWFLASH.EXE
                /MSIE
                    /EN
                    /JA
    /VIDEO_TS
```

Additional directories, runtime software, and programmatic content are added to the above directory structure, as needed, in order to support additional hardware/software platforms, such as different types of personal computers and/or different operating systems, and consumer electronic devices, e.g., set top boxes and the like.

Thus, the DVD-ROM Engine 204 of the present embodiment offers a turnkey, simple Internet solution for all DVDs authored using the DVD-Video Authoring Environment to generate the Authoring Output that includes DVD-ROM content. (Note that as shown the Authoring Output is preferably an extensible markup language (XML) file, i.e., the XML source file, however, as will be appreciated by the person of ordinary skill in the art, and as contemplated by the inventors, the Authoring Output may be any of a number of other formats, including proprietary formats.)

The DVD-ROM Engine 204 parses the XML source file from the DVD-Video Authoring Environment 200 and generates the appropriate HTML and JavaScript code to implement Internet links, as described in further detail below. The DVD-ROM Engine 204 also combines the HTML and JavaScript with client binaries.

In practice (when the DVD-ROM Engine 204 is implemented in an executable form, as opposed to a dynamic link library (DLL)), the XML parser is activated using a command line; copies a new image of the DVD-ROM content from a golden image directory to a destination directory; extracts DVD-ROM Engine variables from the XML source file 202; and performs a search and replace of the instances of those variables in the JavaScript and HTML files in the destination directory.

Command line syntax for the XML parser, in accordance with one embodiment, is as follows: itidvdrom.exe xml_source {/D destination} {/I golden_image} [/G graphic] [/T tag]

where

"xml_source" is a required parameter that specifies a full path of an XML source file, i.e., the Authored Output "destination" is an optional parameter that specifies a full path to where a golden image is to be copied. If not supplied, an ITI_VAR_DESTINATION variable must be provided in the XML source file.

"golden_image" is an optional parameter that specifies a full path to the golden image of the DVD-ROM content. If not supplied, an ITI_VAR_GOLDEN_IMAGE_PATH variable must be provided in the XML source file.

"graphic" is an optional parameter that specifies the path to a graphic to be used in a DVD-ROM content installation screen. If this argument is not supplied, it can be defined in the XML source file using an ITI_VAR_STARTUP_GRAPHIC variable. If it not defined in either place, a Default DVD-ROM Engine Graphic will be used.

"tag" is an option parameter that specifies the ASCII tag name of the element in the XML source file where the DVD-ROM.Engine variables are stored. This is an optional parameter. it is not supplied, the tag name AITIVariables@ used.

Predefined DVD-ROM Engine variables are preferably as follows:

ITI_VAR_DESTINATION versus the destination command line argument

ITI_VAR_GOLDEN_IMAGE_PATH versus the golden_image command line argument

ITI_VAR_STARTUP_GRAPHIC versus the graphic command line argument

The XML source file 202 preferably has the following characteristics: contains the DVD-ROM Engine variables element as child node of the root element; by default, the name of the variables element should be "ITIVariables@ (another alternate tag name can be used and specified on the application command line, as noted above); all DVD-ROM Engine variables must defined in the variables element; a specific set of variables has been established and includes all of the variables that must be replaced in the JavaScript and HTML source files (if any variables are not present, the XML parser returns an error, and any additional variables, not in the set, are ignored).

The following is an exemplary XML source file, such as may constitute the Authoring Output:

```
<?xml version=@1.0@ ?>
<root_element>
Y
Y
< ITIVariables>
    <ITI_VAR_bookcount>123</ITI_VAR_bookcount>
    <ITI_VAR_var2>@This is a Test@</ITI_VAR_var2>
    <ITI_VAR_temp>abc</ITI_VAR_temp>
    <ITI_VAR_xyz>qrsabc</ITI_VAR_xyz>
    <ITI_VAR_DESTINATION>@c:\Program Files\InterActual@</ITI_VAR_DESTINATION>
Y
    Y
</ITIVariables>
Y
Y
</root_element>
<?xml version=@1.0@ ?>
<ITX_Description>
Y
Y
< DVDVideo>
    <ITI_VAR_bookcount>123</ITI_VAR_bookcount>
    <ITI_VAR_var2>This is a Test@</ITI_VAR_var2>
    <ITI_VAR_temp>abc</ITI_VAR_temp>
    <ITI_VAR_xyz>qrsabc</ITI_VAR_xyz>
    <ITI_VAR_DESTINATION>@c:\Program Files\InterActual@</ITI_VAR_DESTINATION>
Y
    Y
</ DVDVideo>
Y
Y
</ ITX_Description>
```

The XML source file 202 generated by the DVD-Video Authoring Environment 200 is used by the DVD-ROM Engine 204 to control the copying of the software from the golden image directory (by specifying the runtime software to copy), and the substitution of variables in and the copying of the JavaScript and HTML source files.

The JavaScript and HTML source files contain multiple variables that are replaced with valid values prior execution of the JavaScript and HTML source files. (These JavaScript and HTML source files may comprise templates that are provided to the author in order to perform functions such as providing a button associated with a URL, or, as described below may be custom JavaScript and HTML source files that are authored within the Development Environment 206.) The values of these variables are provided in the XML source file. The DVD-ROM Engine 204 parses each JavaScript and HTML source file to find instances of the DVD-ROM Engine variables. When a DVD-ROM Engine variable is found, the DVD-ROM Engine looks the DVD-ROM Engine variable up in the list of variables extracted from the XML source file by the XML Parser. The DVD-ROM Engine 204 then replaces the DVD-ROM Engine variable with the value and writes the file back to disk. This process is repeated for all variables in all JAVA Script and HTML source files in the DVD-ROM Engine directory.

The following is exemplary JavaScript code that may constitute a portion of the JavaScript and HTML source files (note that the JavaScript contains variables that will be replaced by values in the XML source file by the DVD-ROM Engine 204):

```
class Bookshelf {
    protected book first,last;
    protected long count;
    Bookshelf( )
    {
        first = last = null;
        count = ITI_VAR__bookcount;
    }
    void add(book aBook)
    {
        if (first != null)
        {
            last.next = new book(aBook);
            last = last.next;
        }
        else
        {
            first = new book(aBook);
            last = first;
        }
        count++;
    }
    long size( ) { return count; }
    void print( )
    {
        book curBook = first;
        int cnt=1;
        while (curBook != null)
        {
            System.out.println ("Book: ITI_VAR__Temp" + cnt++);
            System.out.println("ITI_VAR__var2");
            curBook. showBook ( );
            curBook =curBook.next;
        }
    }
}
Example
```

Using the XML source file 202 from above and the JavaScript code from above, the following JavaScript code results. Note that the variable ITI_VAR_xyz was not used in the code.

```
class Bookshelf {
    protected book first, last;
    protected long count;
    Bookshelf ( )
    {
        first = last = null;
        count = 123;
    }
    void add(book aBook)
    {
        if (first != null)
        {
            last.next = new book (aBook);
            last = last.next;
        }
        else
        {
            first = new book(aBook);
            last = first;
        }
        count++;
    }
    long size( ) { return count; }
    void print( )
    {
        book curBook = first;
        int cnt=1;
        while (curBook != null)
        {
            System.out.println("Book: abc"+
                cnt++);
            System.out.println("This is a Test
");
            curBook.showBook( );
            curBook = curBook.next;
        }
    }
}
```

The Development Environment provides plug-ins for tools such as Visual InterDev, Dreamweaver, Homesite, and Director for HTML content development. The plug-ins assist the author in creating DVD-ROM content by automating the JavaScript creation. For example, the author may select from a menu, in one of the above mentioned tools, "insert play button", and is prompted for the graphics to use with the play button and provided with a dialog to select whether the play button is a play title, play chapter or play time, with edit boxes for the values. The Development Environment 206 also provides a user interface and emulation capabilities for building custom DVD-ROM applications, i.e., custom JavaScript and HTML source files, as mentioned above.

The Development Environment 205 preferably supports multiple languages. In order to support multiple languages, all text messages are in a configuration file. Using a "get locale" from within JavaScript code, these text messages are accessed in accordance with a desired language, so as to show the proper language. For C++ code, resource DLLs and text DLLs, per language, are employed, so that a text DLL appropriate to a desired language can be accessed in accordance with the desired language based on the Operating system language.

The Development Utilities and Templates 208 offer features for simplifying the DVD-ROM creation process. This component includes HTML editor plug-ins, templates for JavaScript and HTML source files, documentation, and online developer support. The HTML editors (i.e., the tools identified above) allow authors to create the JavaScript content that will be used as templates by the DVD-ROM Engine 204. The HTML editor plug-ins may allow, for example, custom graphics created by the author and code to perform DVD calls and URL associations. By way of example, the Development Utilities and Templates preferably include code for features such as a Web button (active for, e.g., entire movie), which allows a user to click the web button in a controller or web page and thereby launch a desired web site; an internet button authored into a DVD menu that launches a desired web site; and Title/Chapter naming (and automatic association with actual title/chapter numbers).

The DVD Formatter 212 calls the DVD-ROM Engine 204 and calls another engine that produces the video assets themselves, according to the DVD being created. The DVD Formatter 212 is a component of the DVD-Video Authoring Environment but is shown as separated since the DVD-Video and DVD-ROM images must be combined before creating/formatting the final image/DLT (digital linear tape).

Figure 3:
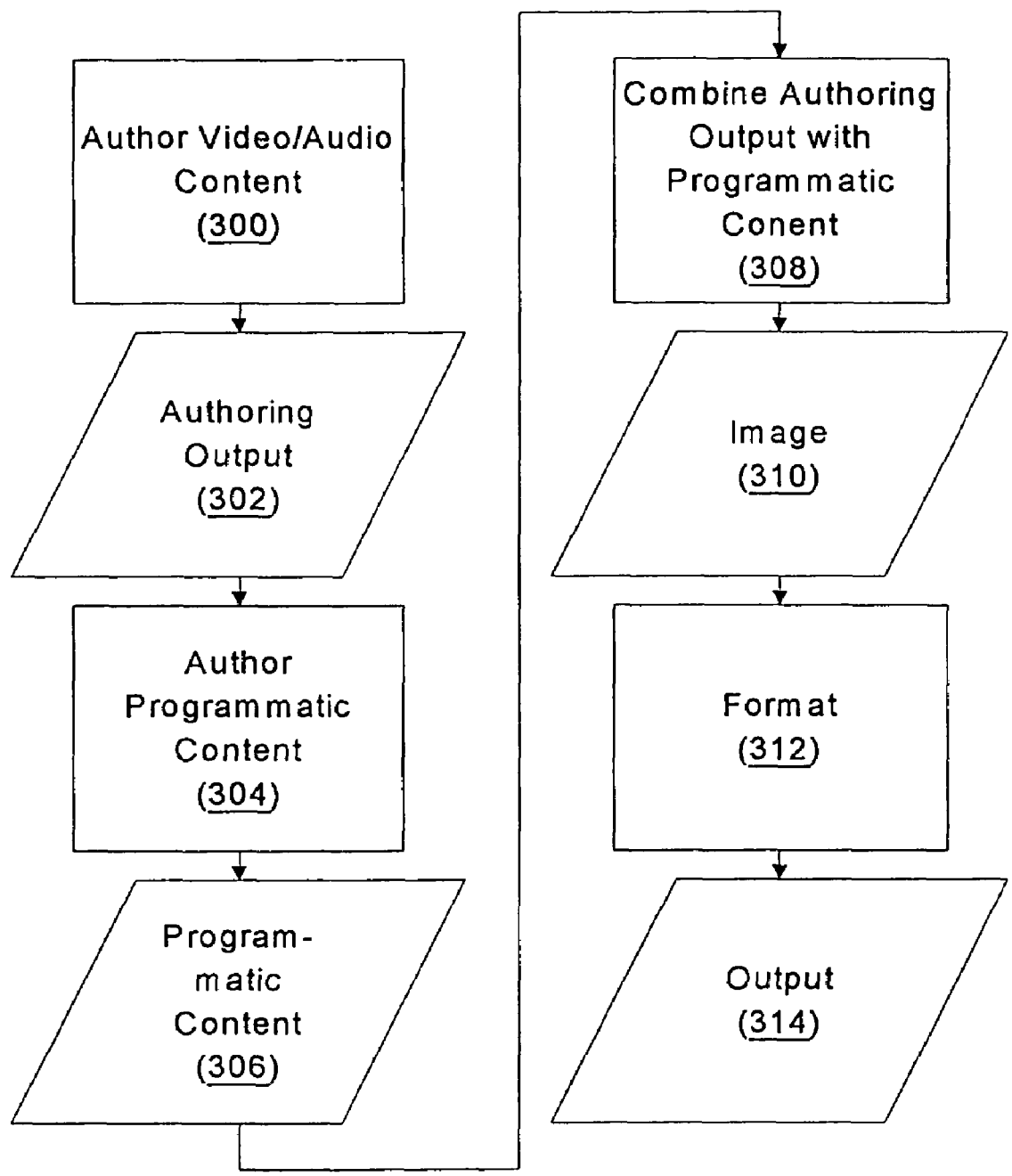
FIG. 3 is a flow diagram depicting steps traversed in operation of the system of FIG. 1.

FIG. 3 is a flow diagram depicting steps traversed in operation of the system of FIG. 1.

At the outset, Video/Audio Content is authored (Block 300) and Authoring Output is generated (Block 302) as a function thereof. The Authoring Output, as mentioned above, defines a plurality of variables that define the Video/Audio content to be contained on the DVD. Next, Programmatic Content (DVD-ROM content) is authored (Blocks 304, 306), or appropriate templates are selected to effect DVD-ROM content for the DVD. Specifically, appropriate JavaScript and HTML source files are selected or authored, each containing at least one variable to be defined as a function of the Video/Audio content and DVD-ROM content to be placed on to the DVD. As a result of the authoring of the DVD-ROM content, software, and programmatic content are provided, and then bound with the Authoring Output (Block 308) (through the DVD-ROM Engine) in order to generate a DVD image (Block 310). The DVD image is communicated to the formatter, which formats the DVD (Block 312), creating final DVD output (Block 314).

While the invention herein disclosed has been described by means of specific embodiments and applications thereof, numerous modifications and variations could be made thereto by those skilled in the art without departing from the scope of the invention set forth in the claims.

What is claimed is:

1. A method for combining video/audio content with programmatic content comprising:
   generating authoring output comprising one or more definitions for one or more variables, and further comprising a representation of the video/audio content corresponding to video/audio content to be displayed, the representation of the video/audio content defining how the video/audio content is to be displayed;
   selecting one or more source files that correspond with at least one of the one or more definitions of the generated authoring output, where each of the one or more source files comprises at least one of the one or more variables;
   searching an instance of each of the one or more source files for said at least one variable, and with each instance of the one or more source files replacing said at least one variable with the corresponding definition for said at least one variable within that instance of the source file such that the instance of the source file contains the corresponding definition for said at least one variable;
   generating programmatic content in accordance with each of the selected one or more source files each comprising the corresponding definition in response to the searching and replacing;
   generating an image as a function of the programmatic content and the representation of the video/audio content; and
   combining the image with the video/audio content.

2. The method of claim 1 further comprising storing said image to a storage medium.

3. The method of claim 1 further comprising transmitting said image through a transmission medium.

4. The method of claim 1 wherein said searching includes searching said source file at build time.

5. The method of claim 1 wherein said searching includes searching said source file at run time in reproducing the video/audio content.

6. The method of claim 5 wherein said searching includes searching in response to a software engine executed on a browser.

7. The method of claim 5 wherein said searching includes searching in response to the insertion of a DVD into a hardware device.

8. A system comprising a processor and memory, where in the memory stores program instructions that at least in part support means for combining video/audio content with programmatic content, the system comprising:

means for selecting one or more source files that correspond with at least one of one or more definitions of an authoring output, wherein the authoring output comprises the one or more definitions for one or more variables and further comprises a representation of the video/audio content corresponding to video/audio content to be displayed, the representation of the video/audio content defining how the video/audio content is to be displayed, and wherein each of the one or more source files comprises at least one of the one or more variables;
   means for searching an instance of each of the one or more source files for said at least one variable, and for replacing within each instance of the one or more source files said at least one variable with the corresponding definition for said at least one variable within that said instance of the source file;
   means for generating programmatic content in accordance with each of the selected one or more source files, each comprising the corresponding definition, in response to the searching and replacing;
   means for generating an image as a function of the programmatic content and the representation of the audio/video content; and
   means for combining the image with the video/audio content.

9. A computer program product stored on a computer-readable medium for use in combining video/audio content with programmatic content comprising:
   code to select one or more source files that correspond with at least one of one or more definitions of an authoring output, wherein the authoring output comprising the one or more definitions for one or more variables, and further comprising a representation of the video/audio content corresponding to video/audio content to be displayed, the representation of the video/audio content defining how the video/audio content is to be displayed, and wherein each of the one or more source files comprises at least one of the one or more variables:
   code to parse each of the one or more source files searching for said at least one variable, to replace in each instance of the one or more source files said at least one variable with a corresponding definition for said at least one variable within that instance of the source file, and to generate programmatic content in accordance with each of the selected one or more source files, each of said one or more selected source files comprising the corresponding one or more definitions, in response to the parsing and replacing;
   code to generate an image as a function of the programmatic content and a representation of the audio/video content, the representation of the audio/video content defining how the video/audio content is to be displayed; and
   code to format and combine the image with the video/audio content.

10. The method of claim 1, wherein the instance of the source file is a copy of the source file.

11. The system of claim 8, wherein the instance of the source file is a copy of the source file.

* * * * *

UNITED STATES PATENT AND TRADEMARK OFFICE
CERTIFICATE OF CORRECTION

PATENT NO.         : 7,448,021 B1                                        Page 1 of 1
APPLICATION NO. : 09/649215
DATED              : November 4, 2008
INVENTOR(S)        : Lamkin et al.

It is certified that error appears in the above-identified patent and that said Letters Patent is hereby corrected as shown below:

Claim 9, column 12, line 39, delete "variables:" and insert --variables;--.

Signed and Sealed this

Twenty-fourth Day of March, 2009

JOHN DOLL
*Acting Director of the United States Patent and Trademark Office*